July 17, 1928. Re. 17,036

K. O. B. TEXTORIUS

METHOD AND MACHINE FOR MAKING CORD TIRES

Original Filed Sept. 4, 1919 11 Sheets-Sheet 1

Inventor
Knut O.B. Textorius

By C. P. Goepel
Attorney

July 17, 1928. Re. 17,036

K. O. B. TEXTORIUS

METHOD AND MACHINE FOR MAKING CORD TIRES

Original Filed Sept. 4, 1919 11 Sheets-Sheet 2

INVENTOR
Knut O. B. Textorius
BY
C. P. Goepel
ATTORNEY

July 17, 1928. Re. 17,036
K. O. B. TEXTORIUS
METHOD AND MACHINE FOR MAKING CORD TIRES
Original Filed Sept. 4, 1919 11 Sheets-Sheet 3
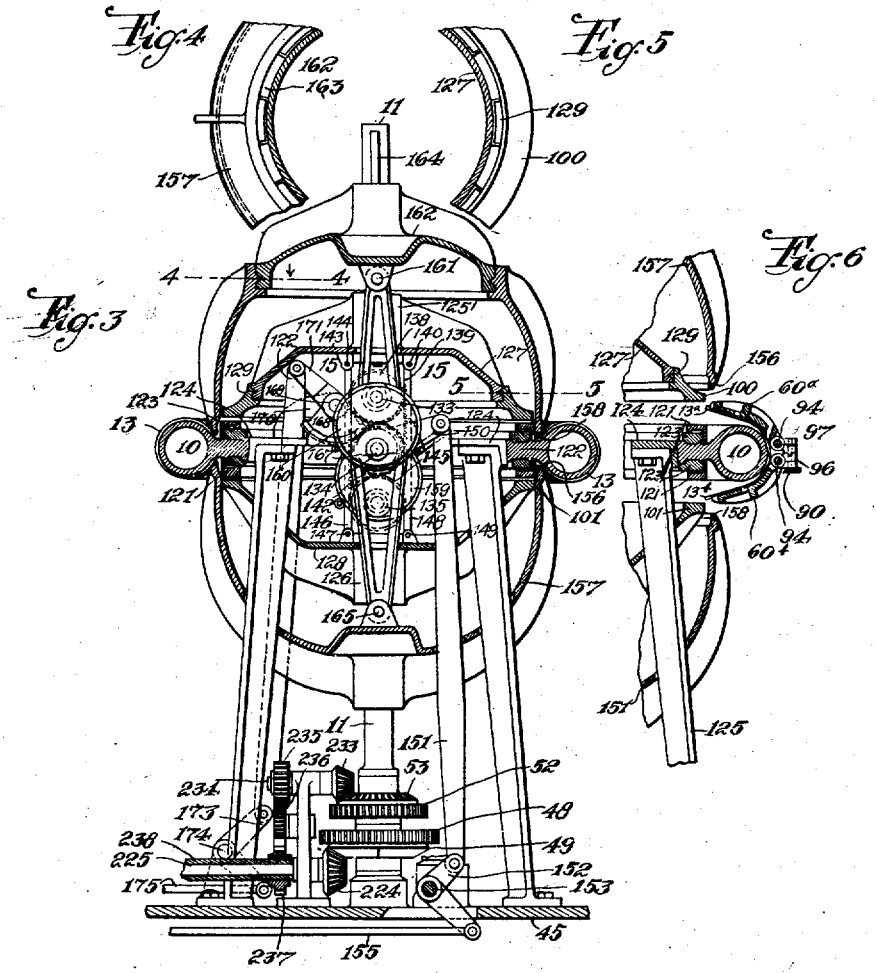
INVENTOR
Knut O. B. Textorius
BY C. P. Goepel
ATTORNEY July 17, 1928.

Re. 17,036

K. O. B. TEXTORIUS

METHOD AND MACHINE FOR MAKING CORD TIRES

Original Filed Sept. 4, 1919 11 Sheets-Sheet 4

INVENTOR
Kaut O. B. Textorius
BY
C. P. Goepel
ATTORNEY

July 17, 1928. Re. 17,036
K. O. B. TEXTORIUS
METHOD AND MACHINE FOR MAKING CORD TIRES
Original Filed Sept. 4, 1919 11 Sheets-Sheet 5
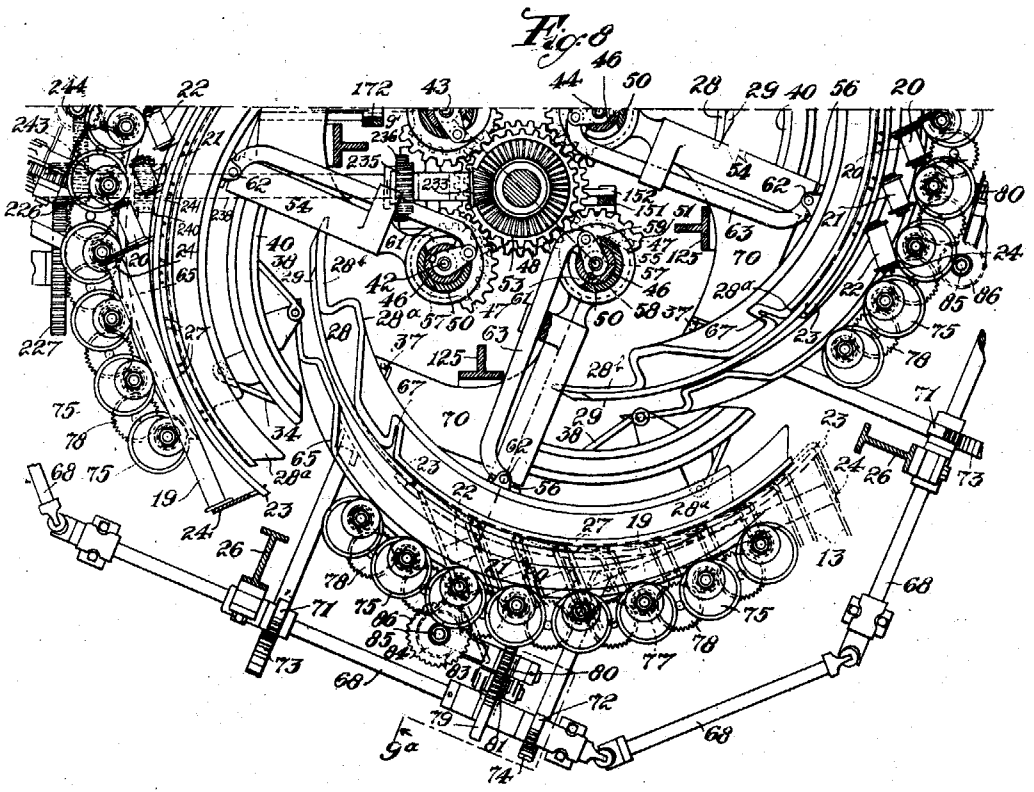
INVENTOR
Karl O. B. Textorius
BY
C. P. Goepel
ATTORNEY July 17, 1928.
Re. 17,036
K. O. B. TEXTORIUS
METHOD AND MACHINE FOR MAKING CORD TIRES
Original Filed Sept. 4, 1919 11 Sheets-Sheet 6
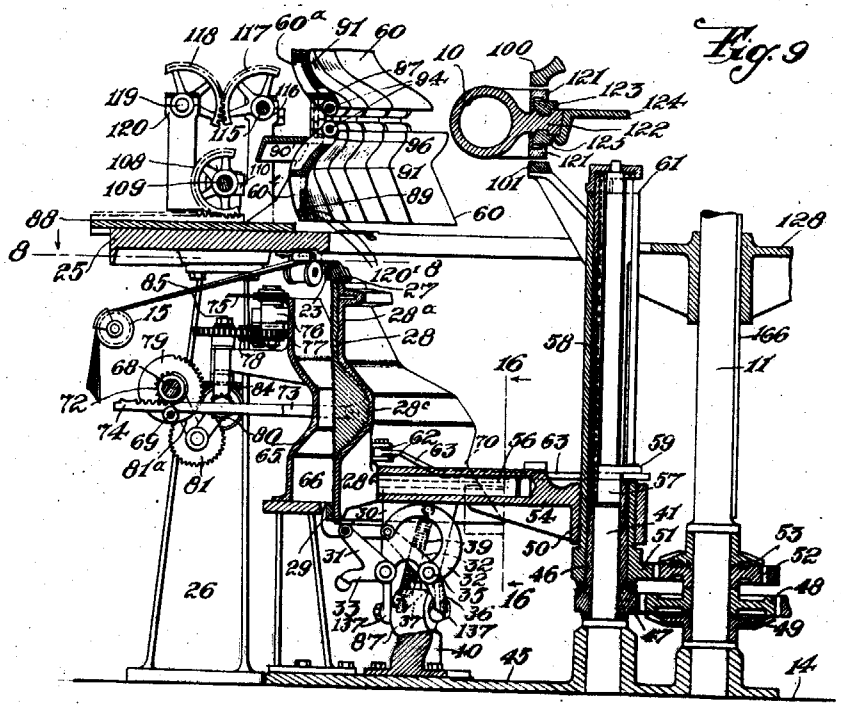
INVENTOR
Knut O. B. Textorius
BY
C. P. Gulpel
ATTORNEY July 17, 1928.

Re. 17,036

K. O. B. TEXTORIUS

METHOD AND MACHINE FOR MAKING CORD TIRES

Original Filed Sept. 4, 1919 11 Sheets-Sheet 7

INVENTOR
Kurt O. B. Textorius
BY C. P. Goepel
ATTORNEY

July 17, 1928.

Re. 17,036

K. O. B. TEXTORIUS

METHOD AND MACHINE FOR MAKING CORD TIRES

Original Filed Sept. 4, 1919 11 Sheets-Sheet 8

INVENTOR
Knut O. B. Textorius
BY C. P. Goepel
ATTORNEY

July 17, 1928. Re. 17,036

K. O. B. TEXTORIUS

METHOD AND MACHINE FOR MAKING CORD TIRES

Original Filed Sept. 4, 1919 11 Sheets-Sheet 9

INVENTOR
Knud O. B. Textorius
BY C. P. Goepel
ATTORNEY

July 17, 1928.

Re. 17,036

K. O. B. TEXTORIUS

METHOD AND MACHINE FOR MAKING CORD TIRES

Original Filed Sept. 4, 1919 11 Sheets-Sheet 10

INVENTOR
Knud O.B. Textorius
BY
C. P. Goepel
ATTORNEY

July 17, 1928. Re. 17,036

K. O. B. TEXTORIUS

METHOD AND MACHINE FOR MAKING CORD TIRES

Original Filed Sept. 4, 1919 11 Sheets-Sheet 11

INVENTOR
Knud O. B. Textorius
BY C. R. Gaefel
ATTORNEY

Reissued July 17, 1928. Re. 17,036

UNITED STATES PATENT OFFICE.

KNUT O. B. TEXTORIUS, OF NEW YORK, N. Y., ASSIGNOR, BY DIRECT AND MESNE ASSIGNMENTS, TO TEX. ENGINEERING CORPORATION, OF NEW YORK, N. Y., A CORPORATION OF NEW YORK.

METHOD AND MACHINE FOR MAKING CORD TIRES.

Original No. 1,359,632, dated November 23, 1920, Serial No. 321,533, filed September 4, 1919. Application for reissue filed April 29, 1922. Serial No. 557,459.

This invention relates to a method and machine for making cord-tires. In the present state of development of this art, the carcass or casing for pneumatic vehicle wheel tires which encloses the inner inflatable tube is largely composed either of sheets or laminations of woven textile fabric vulcanized together, or, on the other hand, of circumferentially continuous layers of individual cords superimposed on each other, the cords of adjacent layers extending in reverse angular directions with respect to the longitudinal axis of the tire. It has been found in practice that tire casings of the latter construction are superior in wearing quality and give greater general satisfaction than tire casings of the textile or fabric construction. However, the method of manufacture of tire casings of the latter class is simpler than the method heretofore employed in the production of cord tires. It is primarily due to the fact that known methods of manufacturing cord tires are very time-consuming and exacting in the care with which the numerous manual operations must be carried out, that such tires are relatively expensive.

Generically considered, it is therefore the primary object and purpose of my present invention to provide a method of manufacturing cord tires which is relatively simple, will greatly expedite production, eliminate much of the onerous manual labor heretofore required and will, therefore, appreciably reduce the manufacturing and selling cost of such tires.

In one practical example of the new method I first assemble individual cords of predetermined length in parallel relation to each other, said cords being closely arranged and adhesively connected by a suitable rubber composition and I then form the multiplicity of assembled cords into a continuous annular layer corresponding to the cross-sectional shape of a tire. Upon the first cord layer of this character there is built up a succession of other cord layers similarly formed in superposed relation until a body for the tire carcass of the desired predetermined thickness is produced.

It is also the purpose of my present invention to provide a machine for automatically assembling the individual cords and applying or laying up the successive superimposed cord layers by means of a series of such machines upon a tire forming core. Among the more important characteristics of this machine, may be mentioned a simple and novel mechanism for assembling the individual cords from a series of cord rolls and automatically severing the assembled cords to obtain the desired length thereof; means for transferring the assembled cords to a cord layer mounted for radial movement with respect to the forming core, and an improved construction of the cord layer and operating means therefor to fold the series of cords about and upon the body of a tire forming core.

Another important feature of the invention resides in the provision of simple and effective means for clamping the ends of each cord layer to the core and thereby applying a proper tension to the cords.

To the above ends my improvements comprise features which are illustrated in the drawings accompanying this specification, wherein Figure 1 is a general plan view of the whole machine;

Fig. 3 is a similar sectional elevation to that of Fig. 2 but looking in the direction of arrow 3 of Fig. 1;

Fig. 4 is a fragmentary sectional plan view of a portion of what is shown in Fig. 3, the section being taken on line 4, 4 of Fig. 3;

Fig. 5 is a fragmentary sectional plan view of another portion of what is shown in Fig. 3, the section being taken on line 5, 5 of Fig. 3;

Fig. 6 is a fragmentary vertical section similar to a portion of what is shown in Fig. 3 but with the several parts in different relative positions;

Fig. 8 is a plan view of the cord-gripping mechanism, corresponding with Fig. 9, those portions above line 8, 8 of said Fig. 9 being removed;

Figure 1:
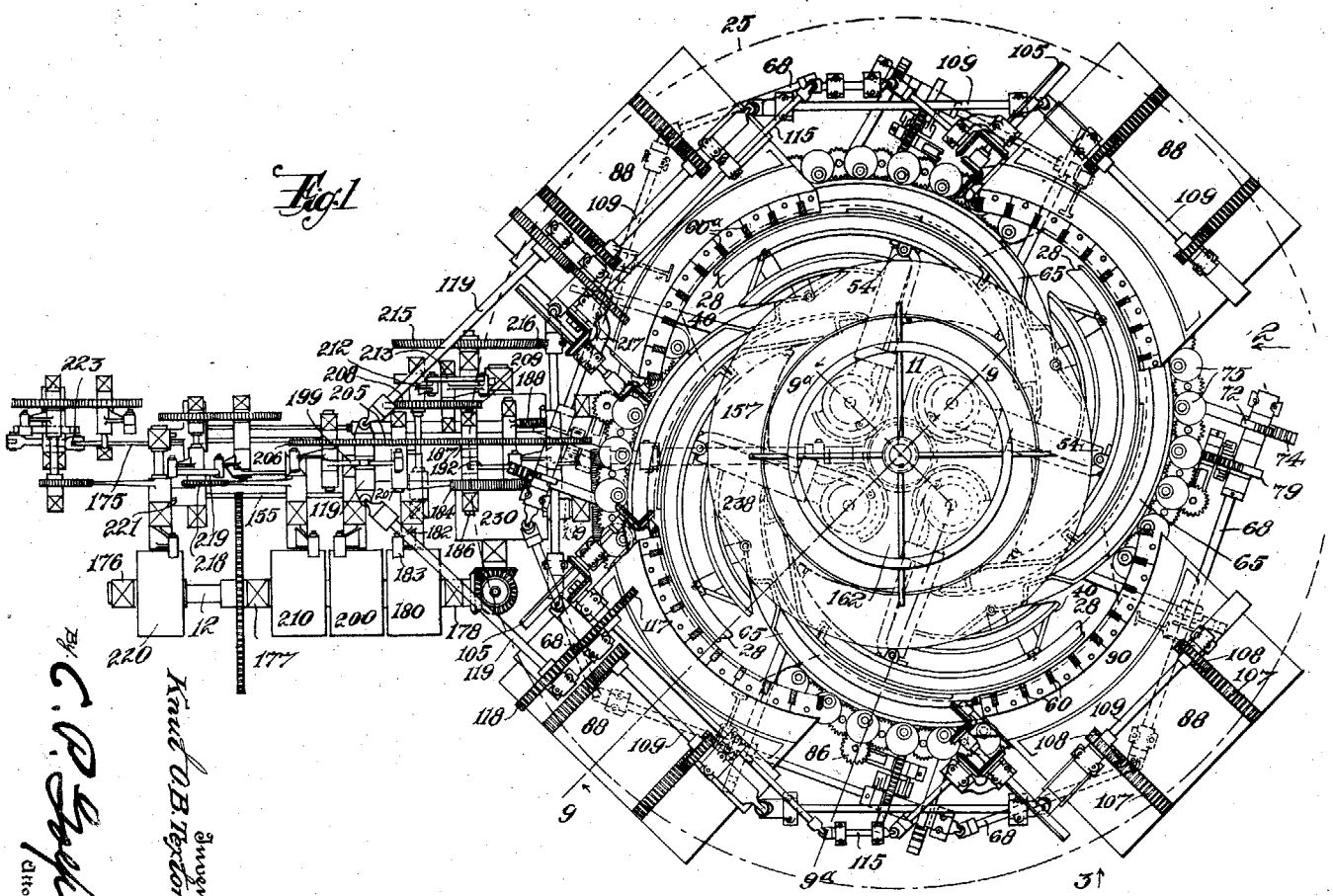
Figure 2:
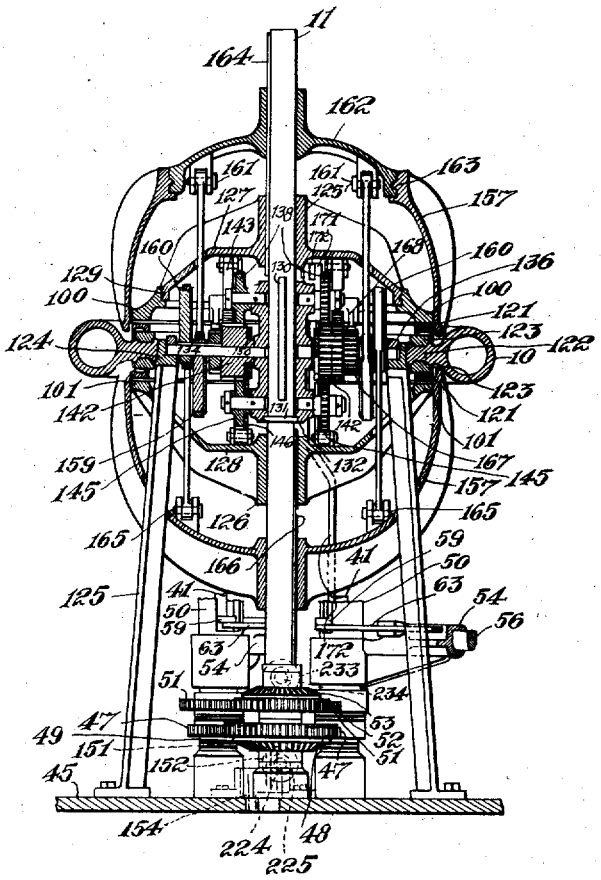
Fig. 2 is an end elevation, largely in section, looking in the direction of arrow 2 of Fig. 1 of the core carrier and its adjacent mechanism.
Figure 11:
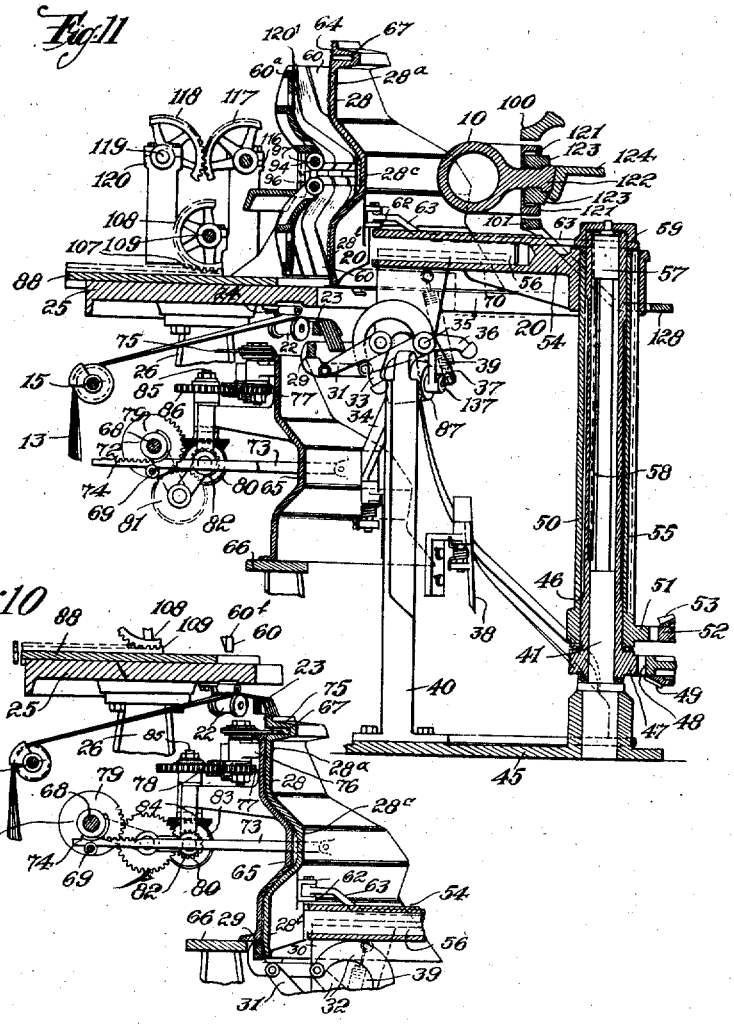
Figure 10:
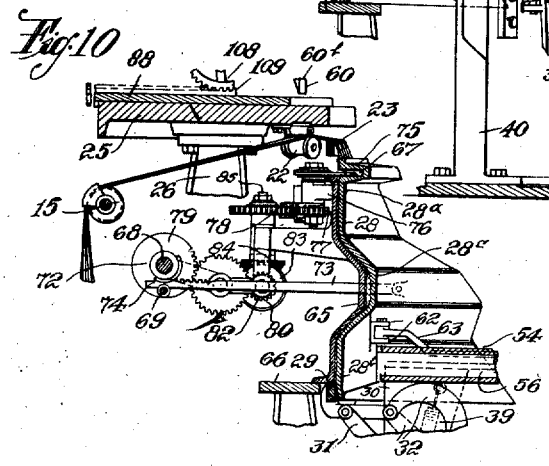
Figures 12, 13, 14:
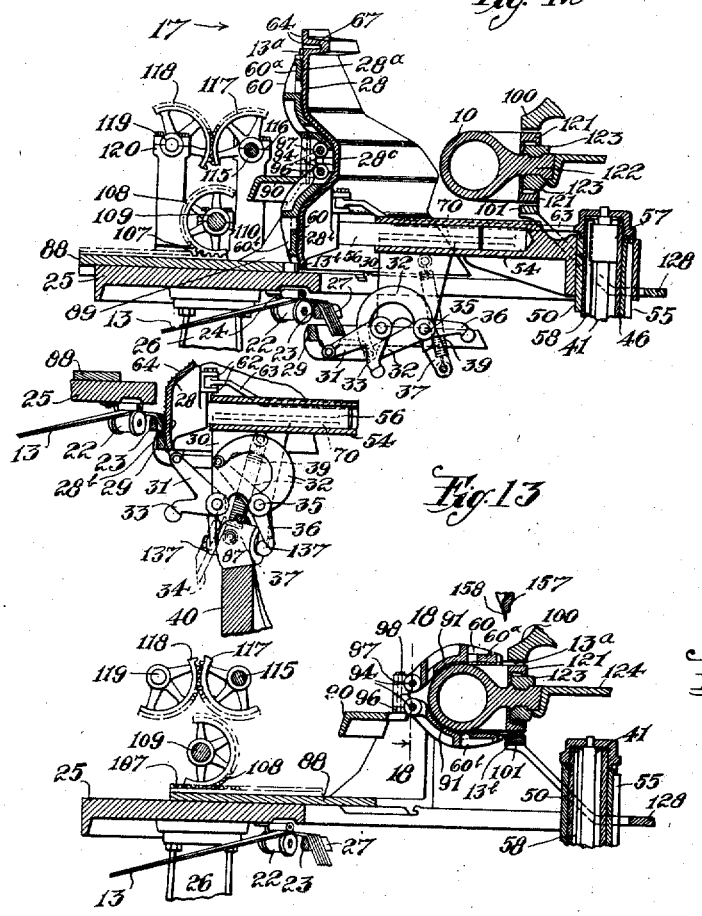
Figure 15:
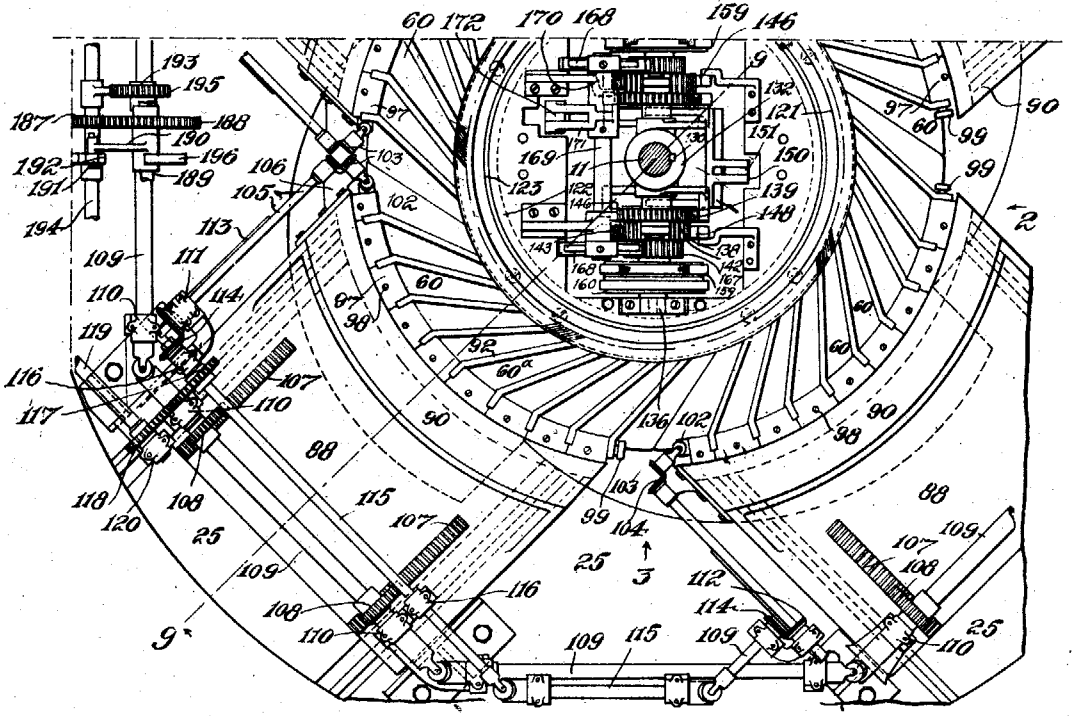
Figure 16:
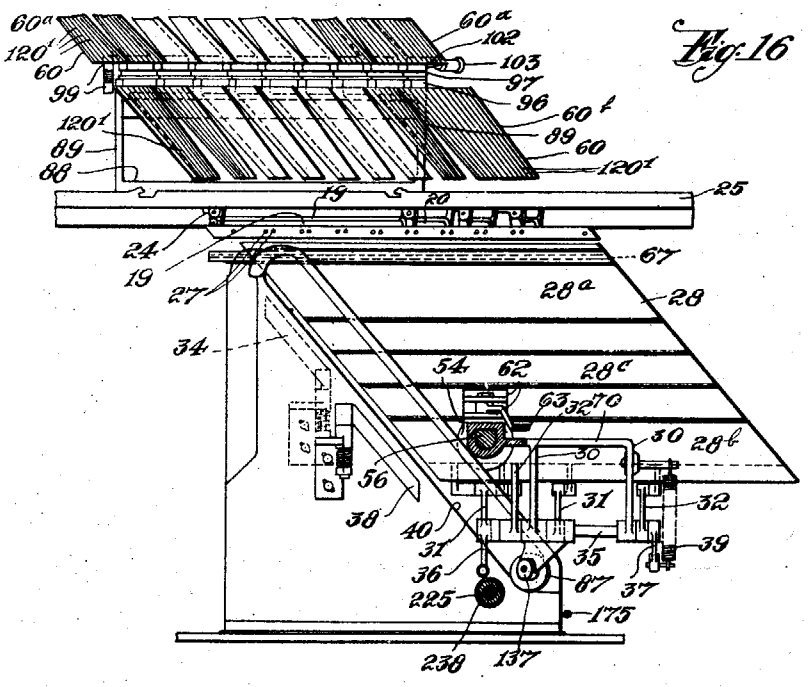
Figure 17:
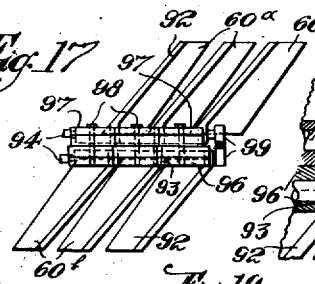
Figure 18:
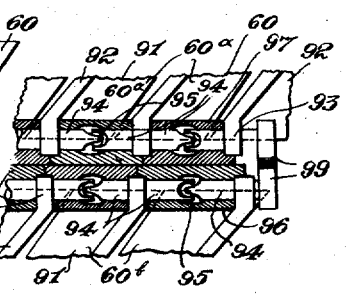
Figure 19:
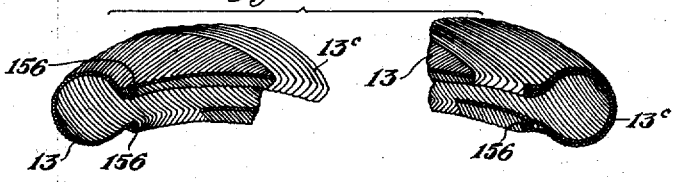
Figure 20:
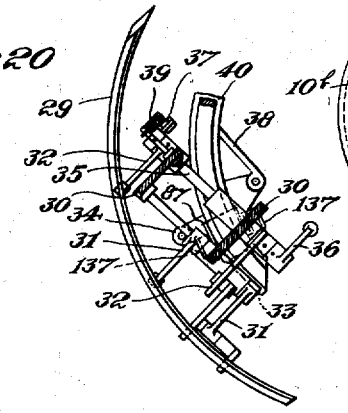
Figure 21:
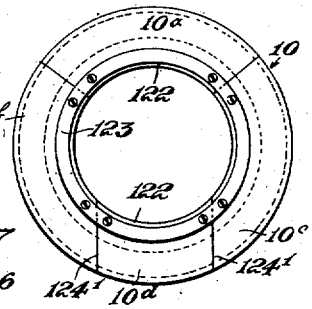

Fig. 9 is a sectional elevation of a portion of what is shown in Fig. 1, the section of that portion lying above table 25 being taken on line 9, 9 in Figs. 1 and 15, and the section of that portion lying below said table being taken on line 9ᵃ, 9ᵃ, in Figs. 1 and 8;

Fig. 10 is a fragmentary sectional elevation similar to that of a portion of Fig. 9, and showing a step in the operation of the machine subsequent to that of Fig. 9;

Fig. 11 is a sectional elevation similar to those of Figs. 9 and 10 showing a step in the operation subsequent to that of Fig. 10;

Fig. 12 is a sectional elevation similar to a portion of Fig. 11 and showing a subsequent step in operation;

Fig. 13 is a sectional elevation similar to a portion of what is shown in Fig. 12 and showing a further step in operation;

Fig. 14 is a sectional elevation similar to a portion of what is shown in Fig. 12 and showing the delivery of the cords about the forming-core;

Fig. 15 is a plan view of the mechanism for laying the cords on the forming-core, corresponding with the fragmentary elevation of Fig. 14;

Fig. 16 is a fragmentary elevation showing one of the cams 40, and one quadrant of the cord-folders 60 developed into a plane. The view is taken in the direction of arrow against line 16 in Fig. 9;

Fig. 17 is a rear elevation developed into a plane, looking in the direction of arrow 17 of Fig. 12, of a portion of one of the cord-folders 60;

Fig. 18 is a vertical section of a portion of one of the cord-folders, the section being taken through the bearings, on line 18, 18 of Fig. 14;

Fig. 19 is a perspective view of a portion of the product of my improved machine;

Fig. 20 is a fragmentary plan view of the carrying and operating means for the cord-grippers. The view is taken looking in the direction of arrow against line 20 in Fig. 11;

Fig. 21 is a detached plan view of the forming-core.

For convenience of description the machine of the present invention may be divided into several coacting sub-mechanisms and to that end the machine will be considered as it operates in consecutively advancing the cords from their source of supply to their delivery and seating about the forming-core.

*General description.*—The principal mechanisms of my improved machine are grouped about an annular forming core 10, preferably arranged in a horizontal plane and having axial shaft 11 upstanding vertically therethrough. Said principal mechanisms, because they are required to operate at all points about the circumference of said core 10, are conveniently divided into a plurality of duplicate segmental portions, all the segmental portions of any one kind uniting to form a complete circumferential mechanism. For convenience of illustration said mechanisms are shown as quadripartite, but might with equal propriety comprise more parts or possibly less. Each set of quadripartite mechanism is a duplicate of each of the other three of its kind and all operate in unison, so that each sub-operation is carried on throughout the whole circumference at one time.

Motion is transmitted to the various sub-mechanisms at the proper times, through shafting, gearing, cams, intermittent transmission and the like, all from main shaft 12, Fig. 1, which, by suitable known means connected with gear 7 but not shown, is caused to make one half rotation and stop; the complete operative cycle of the machine taking place during one half rotation of said main shaft.

In describing the various sub-mechanisms of my improved machine, the description will be confined to one each of the quadripartite elements, it being understood that such description will serve equally for the other three of the same kind.

*Cord supply and gripping mechanism.*—This mechanism is particularly shown in Figs. 8, 11, 13, 9 and 20. The cords 13, previously impregnated with a soft and sticky solution of rubber, are received from a source of supply, not shown, but which is preferably located below floor 14, over guide rolls 15 and thence over delivery rolls 19, 20, 21 and 22, positioned and proportioned to approximately conform to the contour of fixed curved rail 23. Said delivery rolls may be supported in bearings as 24 depending from table 25. Said table is of annular conformation and may be supported from floor 14 by suitable legs as 26. In Fig. 1 said table 25 is shown by dot and dash line only and is regarded in that figure as transparent, so as to show in full lines those parts below said table. Curved rail 23, it will be observed, is not a continuous circular rail but is one of four similar members each corresponding with one of the general quadripartite sections of the machine. Said rail is hung from extensions of delivery roll bearings 24, see Fig. 8. For spacing the cords properly as they pass over said rail and for preventing said cords from dragging sidewise as they are led later in an angular direction by the descent of cord-carrier 28 in a helical path, pins 27 are provided, projecting a short distance from the inner face of said rail. For gripping the leading ends of the cords to the lower portion of the face of cord-carrier 28, clamp 29 suitably hinged for parallel movement in ears 30, depending from web 70 of arm 54, is provided. Said clamp 29 is hinged to said ears 30 by links 31, 32, and one of links 31 has ball-ended projection 33 thereon for engagement with spring-seated latch-cam 34, Figs. 8 and 16, pivotally mounted on the outer face of cord-carrier cam 40. Links 32 are fixed to rock-shaft 35 to which are also fixed ball-ended arm 36 and spring arm 37. Said ball-ended arm 36 engages at suitable times spring-seated latch cam 38, pivotally mounted on the inner face of cord-carrier cam 40. Arm 37 is connected by spring 39 with a pin outstanding from one of ears 30 and said spring acts alternately on either side of the axis of rock-shaft 35.

*Cord-carrying mechanism.*—This mechanism is particularly shown in Figs. 8, 9, 10 and 16 and the description thereof will include the cutting mechanism, which operates directly after the cords have been pressed into the carrier. Arranged about and parallel with central shaft 11, at equal distances therefrom, are four shafts 41, 42, 43 and 44, fixed in bed-plate 45, which plate also supports central shaft 11. Directing attention particularly to shaft 41, mounted for oscillation thereon is sleeve 46, extending substantially the whole length of said shaft. Near the lower end of said sleeve is formed gear-segment 47 meshing with gear 48 turning freely on shaft 11. Fixed to the lower face of said gear 48 is bevel-gear 49 for turning therewith. Surrounding sleeve 46 and nearly co-extensive lengthwise therewith is sleeve 50, having formed thereon near its lower end gear segment 51 meshing with gear 52 turning freely on shaft 11, just above gear 48 thereon. Fixed to the upper face of gear 52 is bevel-gear 53 for turning therewith. Rotary motion is transmitted to bevel gears 49 and 53 from the main driving train of the machine by means to be hereinafter described. Mounted on sleeve 50 for sliding engagement therewith is cord carrier arm 54. Said arm, while free to move lengthwise on said sleeve 50, is constrained for rotative movement therewith by key 55 in coengagement therewith.

Cord-carrier 28, of curved contour in plan view, Fig. 8, comprises in vertical section, Fig. 9, upper and lower straight portions $28^a$ and $28^b$, respectively, connected by a dished midportion $28^c$, all conforming in general profile to the profile of the cord-folders 60 thereabove. The outer face of said cord-carrier 28 is preferably provided with a series of parallel grooves 64, Fig. 11, from top to bottom, for the reception of the cords, one groove to a cord, and said grooves are angularly disposed in substantial parallelism with the end profiles of said cord-carrier, Fig. 16. Also near its top and parallel therewith, through its grooved face is slot 67 for the reception of the cord-severing knives. Projecting inwardly from said cord-carrier 28, toward shaft 41 is stout stem 56 for sliding engagement within the socket portion of arm 54. Said stem is flattened on its upper face for engagement with a similar flat surface in the socket portion of arm 54 to keep said stem from turning.

For moving cord-carrier 28 toward and from shaft 41 at suitable times, sleeve 57 is slidably mounted on a reduced portion of shaft 41 and is constrained for rotative movement with sleeve 46 by key 58 in coengagement therewith. Said sleeve 57 has arm 59 projecting laterally therefrom through suitable slots in sleeves 46 and 50 just above the hub of arm 54, and said slots are of sufficient length to permit armed-sleeve 57—59 to traverse the reduced portion of shaft 41 from the position of Fig. 9 to that of Fig. 11, and the slot in sleeve 50 is extended circumferentially at its upper end 61, to permit the required oscillation of arm 59. For transmitting the oscillatory motion of arm 59 to produce a radial movement of cord-carrier 28 relatively to shaft 41, said carrier is provided with ears 62, between which is pivoted one end of link 63, the other end of said link being pivoted to the outer end of arm 59.

For coaction with cord-carrier 28 for seating the cords in grooves 64 of the outer face of said carrier, cord-piston 65 is provided. Said cord-piston has an operative surface contour complementary to the major part of the outer face of cord-carrier 28, except that said surface of the cord-piston is not grooved. Said piston falls short of covering the cord-carrier at the top by the vertical distance occupied by cutter-slot 67 and the short wall thereabove. It also falls short of covering the cord-carrier at the bottom by the distance occupied by cord-clamp 29. Said piston is mounted for reciprocation toward and from cord-carrier 28 when that cord-carrier is in its lower and inner position of Figs. 9 and 10, horizontally over the upper face of table 66 upstanding from bed-plate 45. Reciprocatory movement is imparted to said piston from shaft 68, connected to the main driving train by means hereinafter described. Said shaft has fixed thereto intermittent gears 71, 72 in engagement with racks 73, 74, respectively, fixed to said piston. Said racks are supported for engagement with their respective gears by rolls, as 69, pivoted on legs, as 26. Said shaft 68 is rotated one revolution in anti-clockwise direction, Figs. 9 and 10, the first half of which revolution is effective to cause the toothed portions of gears 71, 72 to engage the toothed portions of racks 73, 74, respectively, thus delivering said piston from the position of Fig. 9 to that of Fig. 10, the other half of which revolution is idle. The shaft then rotates a full revolution in clockwise direction, the first half idly and the second half effectively, with the toothed portions of gears 71, 72 in engagement with the toothed portions of racks 73, 74, respectively, thereby returning piston 65 to the position of Fig. 9. In Fig. 10, said shaft 68 and gears 71, 72, while having delivered piston 65 into engagement with its coacting cord-carrier are shown as not having completed their full anti-clockwise revolution but as having completed about three-quarters of that revolution. They are thus shown in said Fig. 10 for reasons which will appear presently herein.

Cord-piston 65 also carries the cord-cutting means comprising a plurality of eccentric rotary knives 75, 75. Said knives are arranged on vertical shafts having bearings 76 extending outwardly from the upper rear portion of said piston, and rotate in one horizontal plane for entrance into slot 67 across the path of the cords. The shafts of cutters 75 have gears 77, respectively, fixed thereto and are connected by intermediate gears 78. Said train of gears 77, 78 is driven from shaft 68 by the following means: Fixed to shaft 68 is intermittent gear 79, driving at certain times, through intermediate floating gear 81, small gear 80 fixed to shaft 82. Also fixed to shaft 82 is bevel gear 83 meshing with bevel gear 84 fixed to vertical shaft 85, to the upper end of which shaft is also fixed gear 86 meshing with adjacent intermediate gears 78, 78 which in turn drive cutter gears 77. Cutters 75 normally stand idle, with their overhanding eccentric portions projecting outwardly away from slot 67, Figs. 8 and 9, and those cutters must not rotate to cut off the cords until piston 65 has seated those cords in carrier 28. However, there is no objection to said cutters rotating idly at any other time and for convenience and in the interest of simplicity of mechanism, during the movement of piston 65 from the position of Figure 9 to that of Figure 10, the plain portion of the periphery of intermittent gear 79, rotating in anti-clockwise direction, will engage plain portion 81[a] of intermediate gear 81 and said intermediate gear 81 being held against rotation on its own axis but having planetary movement about shaft 68, will rotate gear 80 in clockwise direction, thereby causing each of cutters 75 to make about one rotation in anti-clockwise direction and return approximately to their positions, respectively, of Figs. 8 and 9. But immediately piston 65 reaches its inner position, clamping the cords against carrier 28, the toothed portion of gear 70 will engage the toothed portion of intermediate gear 81 and cause cutters 75 to make about one rotation each in clockwise direction thereby severing the cords. Said gear 79 and cutters 75 are shown midway of their operative action in Fig. 10. During the retraction of piston 65, from the position of Fig. 10 to that of Figs. 8 and 9, this operation will be reversed and the cutters returned to their idle positions of said Figs. 8 and 9.

For raising the cord-carrier from the position of Fig. 10, after the cords have been pressed therein by piston 65 and severed by cutters 75, and after piston 65 has been retracted to the position of Figs. 9 and 11, to deliver those cords into position to be taken by the cord-folders 60, Fig. 11, roll 87, pivotally mounted in hubs 137 of one of ears 30, engages cam 40. The oscillatory movement of arm 54 in anti-clockwise direction from the position of Figs. 8, 9 and 10, in connection with the movement of roll 87 angularly upward in cam 40, from the position of Fig. 16, causes cord-carrier 28 to move upwardly in a helical path to the position of Fig. 11.

*Cord-laying mechanism.*—This mechanism is particularly shown in Figs. 3, 6, 9, 11, 12 and 14 to 18 inclusive. Said mechanism comprises, primarily, four sets of cord-layers, indicated in a general way by 60, each set arranged in curved formation in plan view, Figs. 1 and 15, in conformity with forming-core 10 about which they fold for delivering the cord thereon. In Fig. 1 the cord-folders are shown broken off close to their bearings, respectively. Each of said sets of cord-layers is mounted on a carriage, as 88, for reciprocation on table 25 toward and from the forming-core 10. Said carriage at its inner end has upstanding therefrom opposite brackets 89, 89, carrying segmental table 90 on which are mounted bearings for a cord-layer 60. The lateral end edges of the cord-layers and of the cord pistons are disposed in parallel relation and extend at angles of other than 90° with respect to the upper and lower edges of said cord-layers and pistons. The term "cord-layers" as herein employed, is intended to be generic and applicable to mechanical means automatically actuated to apply or lay the cords upon the periphery of a tire forming core. As herein shown said cord layers each comprises a set of upper members 60[a] and lower members 60[b]. The arm portions of said upper members 60[a] extend upwardly to the right at an angle to the horizontal line of the bearings and the arm portions of said lower members 60[b] extend downwardly to the left at an angle to the horizontal line of the bearings, Figs. 17 and 18. Each of said members 60[a] and 60[b] includes an arm portion 91 of curved contour near its axis, to conform to the cross-sectional profile of forming-core 10, and straight at its outer end to deliver the cords to the cord-end-grippers 100, 101, Fig. 14. Said arm portions are preferably provided with small pins 120′ projecting from their inner faces to engage the sticky cords carried by cord-carriers 28, to insure the removal of the cords from said cord-carriers by the cord-folders.

It will also be observed that the arm-portions of those cord-folders 60ᵃ, 60ᵇ, at the opposite ends of each quadripartite section are materially wider than those folders therebetween. This is because of the space required for gearing and the like between adjacent sections of said folders. Arm portion 91 is provided with a back rib 92, Fig. 19, terminating in hub 93 having outstanding horizontally from each side thereof a short shaft 94 terminating in one member 95 of a universal joint for engagement with a similar universal joint member on the end of the next adjacent short shaft 94. Said short shafts 94, extending oppositely from any one hub 93, are in axial line, but the pair of such shafts extending oppositely from the next adjacent hub 93 have their common axis at a slight angle to the axial line of said first mentioned pair to conform to the general curved arrangement of said cord-folders, Fig. 15. To provide for such angular arrangement, said universal joints are interposed as described. It will thus be seen that each of the bearings, as 96, will be bored from both ends in one horizontal plane but at a slight angle to each other. Said bearings are preferably parted on their horizontal axial plane, and the two halves of the lower box 96 may be all bolted to segmental table 90 by one bolt 98, Figs. 17 and 18. Said short shafts, 94, coupled together by universal joints 95, terminate at their right hand ends, Figs. 15, 17 and 18, in intermeshing gear segments 99, and the upper line of said short shafts terminates at its left hand end, Fig. 15, in universal joint 102, by which it is connected to bevel gear 103 meshing with bevel gear 104 on the end of sliding shaft 105. Bearings for bevel gears 103, 104 and the inner end of shaft 105 are carried by bracket 106 fixed to the side of one of brackets 89 of carriage 88. Near the outer end of carriage 88 and at both sides thereof, fixed to table 25, are several upstanding bearings 110, 111, 116, 120, for shafts and gearing for reciprocating the carriage 88, and for oscillating shaft 105 at suitable times.

For actuating carriage 88, opposite racks 107 are fixed to the upper face thereof and are engaged by gear segments 108, respectively, fixed to shaft 109 turning in opposite bearings 110. Said shaft 109 is coupled at its opposite ends by universal joints to other like shafts 109 by which motion is transmitted to the other three carriages 88 and by one of which shafts motion is transmitted from the main driving train to be described later herein. Oscillating shaft 105 is supported at its outer end by bearing 111, in which bearing rotates bevel gear 112, through which said shaft may slide endwise and is constrained to rotation therewith by key 113. Said bevel gear 112 meshes with similar bevel gear 114 fixed to one end of shaft 115 turning in opposite bearings 116. Also fixed to shaft 115 is gear segment 117 meshing with similar segment 118 fixed to shaft 119 adjacently supported in bearing 120. Said shaft 119 receives its power from the main driving train.

*Cord-end seating mechanism.*—This mechanism is particularly shown in Figs. 2, 3, 6, 14, 15 and 21 and includes means for gripping those ends 13ᵃ and 13ᵇ of the cords projecting above and below cord-folder arms 60ᵃ and 60ᵇ, respectively, Fig. 12, see also Figs. 6 and 14; and means for pressing those ends into the circumferential grooves lying between the inner boundary of the tubular portion of forming-core 10 and filler rings 121.

Forming-core 10 is made up of a plurality of section-like members preferably four in number, 10ᵃ, 10ᵇ, 10ᶜ and 10ᵈ, Fig. 21, to permit the disassembling of said core for the removal intact of the laid-up cords thereon. Said members have inwardly-reaching flange-portions, as 122, against the upper and lower faces of which are fastened rings 123 to hold said members in assembled condition. Said flange-portions 122 have their inner faces slightly angled, outwardly and downwardly for snug engagement with ring 124, supported on legs 125 upstanding from bed-plate 45. After lifting core 10 from its seat on ring 124 and removing it from the machine, filler-rings 121, which may be held to their seats, respectively, by friction, may be taken off and then rings 123 may be removed, thereby permitting member 10ᵈ, preferably having parallel ends 124′ in engagement with the adjacent parallel ends of members 10ᵇ and 10ᶜ, to be drawn inwardly toward member 10ᵃ, Fig. 21, and then one by one, the other members of said core may be removed from within the laid-up cords. For gripping cord-ends 13ᵃ and 13ᵇ against the upper and lower faces of filler-rings 121, cord-end-grippers 100, 101, respectively are provided. Said grippers are annular in form as to their operative faces, and terminate inwardly in suitable hubs 125′, 126, respectively, slidably mounted on axial shaft 11 but prevented from turning thereon by suitable keys. Lower gripper 101 may be formed integral with its hub 126 and web 128, said web being provided with openings therethrough for legs 125 and other members. Upper gripper 100 is removably mounted on its web 127 by means of interrupted ring joint 129, of well-known character, Figs. 3 and 5. For actuating said grippers 100, 101 from the positions of Fig. 6 to those of Fig. 14, respectively, the following means are provided. Fixed to shaft 11 by key 130, and resting on collar 131 of said shaft, is gear-head 132. Carried by said gear-head are opposite sets of duplicate gear trains, a description of one of which will suffice for both. Outstanding horizontally from said head 132, and spaced equidistant in a vertical plane, are three shafts 133, 134 and 135. Shafts 133 and 135 are fixed in said head and shaft 134 is free to turn in that head and has a second bearing 136 fixed to ring 124. Mounted for oscillation on shaft 133 is gear-segment 138 meshing with vertical rack 139 connected at its upper end at 140 to web 127 of upper gripper 100. Said rack is urged to engagement with segment 138 by small roll 141 carried by a bracket outstanding from gear-head 132. Mounted for oscillation on shaft 134 is wide gear-segment 142, in engagement with gear-segment 138 and with rack 143 also connected, at 144, to web 127. Opposite rack 139, Fig. 3, mounted for oscillation on shaft 135, is gear-segment 145, meshing with segment 142 thereabove and with rack 146, connected at 147 with web 128 of gripper 101; and opposite thereto, Fig. 3, is similar rack 148 also connected, at 149, with said web 128, and meshing with segment 142. When segments 138 and 145 are rotated in anti-clockwise direction and segment 142 is rotated is clockwise direction, gripper 100 will be caused to move upwardly and gripper 101 to move downwardly from their positions of Fig. 3 to their positions of Fig. 6, respectively, and when those segments 138, 145 and 142 have their direction of rotation reversed those grippers 100, 101 will be moved from their positions of Fig. 6 to those of Fig. 3, respectively.

For oscillating segment 142 and from it, segments 138 and 145, each one eighth turn and back again, arm 150 fixed to said segment 142 has its outer end connected by link 151 to the outer end of arm 152 fixed to oscillating short shaft 153 mounted in bearings on bed-plate 45. Also fixed to said shaft 153 is arm 154 connected by link 155, below bed-plate 45, with operative means to be described later herein.

For pressing ends 13[a] and 13[b] of cords 13 into the circumferential grooves between forming-core 10 and filler-rings 121 and seating in the annular pockets thereby formed, bead-rings 156, respectively, the following means are provided. Said bead-rings 156 are continuous rings, preferably of twisted wire, to furnish the required strength for the edges of the tire or casing, which are engaged by the wheel-rims in seating the tire on the wheel. Said bead-rings are carried by upper and lower bead-ring-spiders 157 and said spiders may be provided with holding-means such as pins 158, Fig. 14, projecting from their faces, respectively, for penetrating between the wires of said bead-rings.

Upper-spider 157 is removably attached to carrier 162 by interrupted ring joint 163, Figs. 3 and 4, and said carrier is slidably mounted on axial shaft 11 and is prevented from turning thereon by key 164. Lower spider 157 is preferably integral and is slidably mounted on axial shaft 11 and is prevented from turning thereon by key 166. Said spider 157 is provided with openings for legs 125, links 151, 172, arms 54 and such other members as may require passage therethrough. Fixed to opposite shafts, as 134, are two pairs of opposite eccentrics, respectively, as 159, 160. The straps of the inner eccentrics, as 159, are pivotally connected, as at 161, with the underside of upper-spider-carrier 162, and the straps of the outer eccentrics, as 160, are pivotally connected, as at 165, to lower spider 157. Said eccentrics are set diametrically opposite to each other and if rotated one half rotation, preferably in clockwise direction, Fig. 3, upper spider 157 will be raised and lower spider 157 will be lowered, from the positions of Fig. 3 to the positions of Fig. 4, respectively. If then said eccentrics be rotated in anti-clockwise direction back to the positions of Fig. 3, said spiders will be returned to their positions of Fig. 3. For thus oscillating said eccentrics the following means are provided: Fixed to shaft 134, adjacent eccentric 159, is gear-segment 167 in engagement with gear-segment 168, of twice its radius, fixed to shaft 169 supported in fixed bearings 170 springing from table 124. Also fixed to said shaft 169 is rock-arm 171 connected by link 172 with one arm of bell-crank 173 pivoted at 174 in a bearing upstanding from bed-plate 45. The other arm of said bell-crank 173 is connected by link 175 with means for rocking bell-crank 173 and arm 171, each through a quarter turn and back again.

Figure 7:
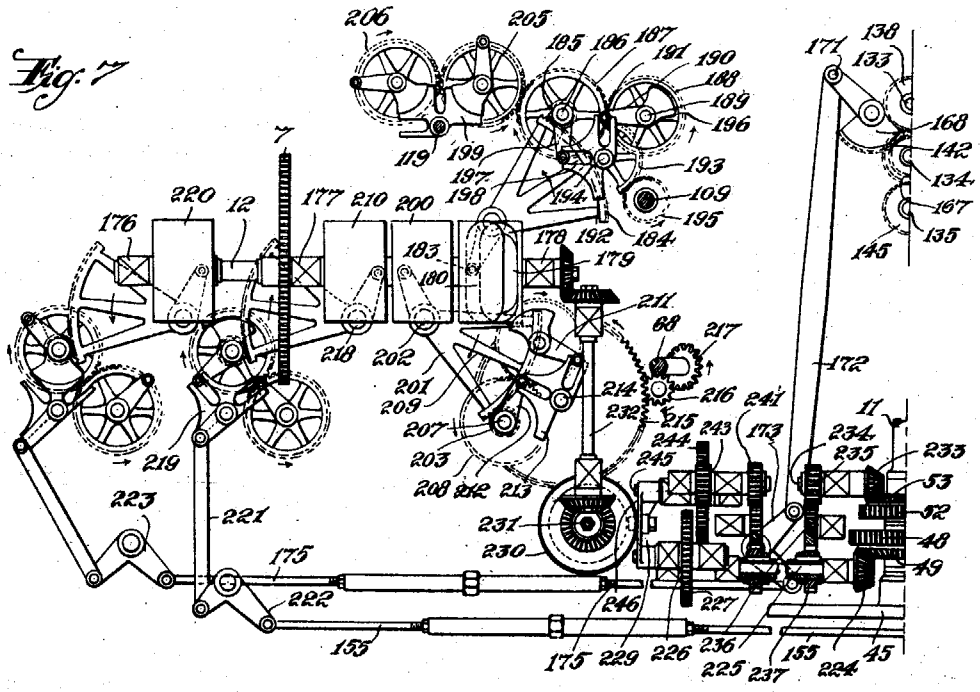
Fig. 7 is a front elevation of the driving mechanism of the machine corresponding with what is shown at the left-hand end of Fig. 1.

*Driving mechanism.*—This mechanism is particularly shown in Figs. 1 and 7, and some of its means for connecting with operative parts of the machine in Figs. 3, 8 and 15.

The several shafts of the driving mechanism are carried in suitable bearings as 176, 177 and 178 of main shaft 12, and said bearings may be supported from floor 41 by legs and the like, not shown, but of well-known character, said supports being omitted in the interest of clarity. Fixed to shaft 12 are a plurality of cams having grooved paths efficient, when shaft 12 is rotated, to impart to several short shafts oscillatory movement through the interposition of suitable arms having rolls thereon for engagement with said grooved paths. A characteristic grooved path 179 is shown in cam 180 and comprises alternate portions of angularly and circumferentially disposed path, respectively. Shaft 181 has arm 182 fixed thereto and carries roll 183 for engagement with cam 180. Also fixed to shaft 181 is gear-segment 184 meshing with small gear 185 fixed to shaft 186. The throw of cam 180 is adapted to oscillate segment 184 in anti-clockwise direction one eighth of a revolution thereby imparting to gears 185 and 187 one full revolution in clockwise direction and to gear 188, meshing with gear 187, one full revolution in anti-clockwise direction. Shaft 189, to which gear 188 is fixed, has also fixed thereto arm 190 carrying roll 191 for engagement with cradle 192. During the first quarter of its revolution in anti-clockwise direction, roll 191 will rotate cradle 192 one quarter revolution in clockwise direction and also gear segment 193, said cradle and gear segment being both fixed to shaft 194. Gear segment 193 will therefore rotate gear 195, fixed to shaft 109, one half revolution in anti-clockwise direction, and segment 196 will engage the coacting portion of cradle 192 to hold the adjacent gearing at rest during the next two quarters of the described revolution of gear 188. When gear 187 has made three quarters of a revolution the roll in the end of its arm 197 will engage slot 198 in cradle 192 and turn that cradle and segment 193, in anti-clockwise direction, whereby gear 195 and shaft 109 will be rotated one half revolution in clockwise direction back to their original positions, respectively. During this time main shaft 12 will have made one half a revolution and have stopped, thus completing one cycle.

During the next half revolution of shaft 12 segment 184 will be rotated in clockwise direction through one eighth of a turn, thereby turning gears 185, 187 a full turn in anti-clockwise direction and the roll on arm 197 will rotate cradle 192 and segment 193 one quarter turn in anti-clockwise direction, the same as before. Then roll 191, during the last quarter of its movement about shaft 189, will return cradle 192 and segment 193 in clockwise direction through a quarter turn. Thus the result on segment 193 and gear 195 is the same, no matter in which direction segment 184 moves. Adjoining gears 187, 188 and forming one train therewith are equal gears 205, 206 each having roll-bearing arms for engagement with cradle 199 fixed to shaft 119 and which mechanism is efficient to impart to shaft 119 a quarter turn in clockwise direction and then a quarter turn back again as already described in connection with cradle 192 and its mechanism. It will be observed that shaft 119 will not be actuated until after shaft 100 has made its half turn and stopped. This is because shaft 109 actuates the cord-layer carriage forwardly for positioning the cord-folders relatively to core 10 and thereafter shaft 119 rotates a quarter turn to move those cord-folders into embracing relation to said core.

Second cam 200, having a grooved path, not shown, similar to the grooved path in cam 180, is efficient, through arm 201 and the roll carried thereby, for imparting to shaft 202 an eighth of a revolution in clockwise direction and later back again, and thence to gears 203 and 208, fixed to shaft 207, one full revolution. Gear 209 equal to and meshing with gear 208 carries arm 211 and gear 208 carries arm 212. These arms have rolls for engagement with cradle 213 fixed to shaft 214, to which is also fixed large gear 215. Gear 217 fixed to shaft 68 is connected through intermediate gear 216 with gear 215 of four times its size. By this mechanism shaft 68 is rotated one full revolution in anti-clockwise direction and then back again during a half revolution of shaft 12.

For reciprocating link 155 for imparting to bell-crank 152 a quarter turn and to lever 150 one eighth turn and back again, cam 210 and its connected members from arm 218 to cradle 219 are provided, in coaction with link 221 and bell-crank 222, to which latter said link 155 is connected. As this cradle mechanism is similar to those already described, detail description thereof is omitted.

Similar mechanism, operated from cam 220, is provided for oscillating bell-crank 223, connected by link 175 with bell-crank 173, one quarter turn and back again. It will be observed that the timing of the mechanism operated from cam 220 is set for one quarter of a revolution of the cradle operating arms later than that of the mechanism operated by cam 210. This is because the cord-grippers 100, 101 operated from cam 210, must operate before bead-ring spiders 157, operated from cam 220.

For oscillating bevel gears 49 and 53, near the foot of axial shaft 11, the following means are provided: Meshing with bevel gear 49 is bevel pinion 225 fixed to one end of shaft 225. Near the other end of said shaft is gear 226 meshing with gear 227 on short shaft 228, on one end of which is arm 229, having a roll in engagement with cam 230 fixed to shaft 231. Said shaft 231 is driven from shaft 12 through two pairs of miter gears and vertical shafts 232.

Meshing with bevel gear 53 is bevel pinion 233, fixed to one end of short shaft 234, to the other end of which is fixed spur gear 235 connected by intermediate gear 236 with gear 237 fixed to one end of tubular shaft 238 having its bearing on shaft 225. To the other end of tubular shaft 238 is fixed gear 239, connected by intermediate gear 240 with gear 241 fixed to the end of shaft 242. Near the other end of shaft 242 is fixed gear 243 meshing with gear 244, fixed to shaft 345 carrying arm 246 having a roll in engagement with a cam, not shown, similar to cam 230 and fixed to shaft 231 behind cam 230, Fig. 7.

Shafts 234 and 242 might well be one continuous shaft, dispensing with the offset gearing to tubular shaft 238 except that one of cams 40 lies in the path of said shaft, and shaft 225 and tubular shaft 238 pass through the lower wall of said cam, Fig. 16.

*Operation.*—The operation of my improved machine is as follows: For clarity and continuity of description, the several steps in operation will follow the advancement of the cords from their introduction over rolls 19, 20, 21 and 22 and thence over rails 23, and so on, until their delivery and seating on forming-core 10 and the removal of that core from the machine.

The leading ends of the cords are presented to the machine over rolls 19 to 22 inclusive and thence positioned over rail 23 ready to be clamped to the cord-carriers 28. Said cord-carriers, after being retracted horizontally from engagement with cord-layers 60, by means of links 63, Fig. 12, are carried helically downwardly by arms 54, being guided by rolls 87 in cams 40, respectively, to the position of Fig. 13, and during that downward movement clamps 29 lying behind the cord ends in Fig. 12 are swung upwardly by the engagement of the ball-ends of arms 33 with cams 34, respectively, and, clamp those ends against the lower portions of the faces of cord-carriers 28. Said cord-carriers with the cord-ends gripped thereto continue their downward movement, drawing over rolls 19 to 22 and rails 23, sufficient lengths of cords, respectively, to reach angularly downwardly over the faces of said cord-carriers, Fig. 9. Thereupon cord-pistons 65 move from their positions of Fig. 9 to those of Fig. 10, respectively, and press the cords into the grooves in the vertical portions $28^a$ and $28^b$ and into the dished portions $28^c$, respectively, Fig. 10, thereby drawing over rails 23 a further portion of cords. Directly after the cord-pistons have seated the cords in the grooves of the cord-carriers, eccentric cutters 75 rotate effectively to sever the cords opposite slots 67 in the upper portions of cord-carriers 28, respectively. The severed cords being now firmly seated in the cord-carriers, cord-pistons 65 withdraw from the position of Fig. 10, and the cord-carriers, oscillated by arms 54 and directed upwardly by their rolls 87 in cams 40, respectively, rise in helical paths to the level of the cord-layers, respectively, Fig. 11. During this upward travel of said cord-carriers the ball-ends of arms 36 engage cams 38 and swing clamps 29, respectively, from engagement with the cord lower ends and leave those clamps in position for clamping the next increment of cords to the cord-carriers as those carriers descend, as already described. Next, links 63 push the cord-carriers outwardly, delivering the cords therein onto the faces of cord-layers 60 where they are retained by pins 120′, Fig. 9. Then said cord-carriers withdraw from the position of Fig. 12 and descend from in front of said cord-layers to in front of the cord-pistons, Fig. 9.

Thereupon carriages 88, on which are mounted cord-layers 60, respectively, are moved inwardly toward core 10, and the cord-folders each swinging a quarter turn, lay the cords in parallel angular positions, respectively, about the outer half of core 10 and lay the projecting ends $13^a$ and $13^b$ of the cords against the upper and lower faces of filler-rings 121, respectively, Fig. 6. It is customary and preferable to cover core 10 with a thin sheet of unvulcanized and more or less sticky rubber, not shown, before delivering the cords thereon, to provide a lining for the casing. Then cord-end-grippers 100, 101 move into engagement with said cord-ends and grip them against filler-rings 121, respectively, Fig. 14.

The cords, now being in possession of the forming-core and its gripping mechanism are released by the cord-folders which open and are retracted with carriages 88, respectively, to the position of Fig. 11 ready to receive another increment of cords. During this retirement of cord-layers 60, bead-rings spiders 157, having been previously supplied with bead-rings 156, respectively, deliver those bead-rings against the bight of the cords and press the cords into the annular channels adjacent the peripheries of filler-rings 121, drawing the cords tightly about core 10, as the cord-ends are pulled from the grip of end-grippers 100, 101, respectively, Fig. 3. Grippers 100, 101 and spiders 157 then retract to the positions, respectively, of Fig. 6, leaving bead-ring 156 seated in place, and the operation of laying one set of cords is completed.

Core 10, having a continuous layer of angularly laid cords thereon with their ends held in place by bead-rings 156 is then ready for removal from the machine. Such removal is accomplished by unlatching upper spider 157 from its carrier 162 and lifting said spider vertically off from the machine; then upper end-gripper 100 is similarly unlatched and lifted off. This leaves core 10 free to be parted from its seat on ring 124, from whence it may be lifted up, over web 127 and carrier 162 and so off the machine.

If only one layer of cords is desired, filler-rings 121 are then removed, the holding means for rings 123 released and those rings removed. This permits segment $10^d$ of core 10 to be withdrawn and thereafter the other segmental portions of core 10, Fig. 21. On the other hand, if it is desired to lay one or more additional layers of cords as 13$^c$, Fig. 19, over the one already laid, the core is removed from the macihne as described but said core is not dismantled. However, filler-rings 121 are removed to provide space between the ends of the cords already laid and the outer edges of rings 123, respectively, for the ends of the next layer of cords. For assembling and laying said second layer 13$^c$, a machine which is a substantial duplicate of the present one is employed, the only essential difference being that the angular inclination of the showing of Fig. 16 and the coacting parts in other figures would be reversed, so as to lay the second layer of cords crosswise to the first layer, Fig. 19; and that cord-layers 60, cord-carriers 28 and their coacting mechanism would be enough larger to accommodate the core 10 having one layer of cords thereon; also the operative faces of spiders 157, instead of being adapted to carry bead-rings 156, would be formed to tuck in the ends of cords 13$^c$.

From the foregoing description, it is thought that the subject matter of my present invention will be fully understood. In the methods now employed for making cord tires, it is quite difficult to apply the individual cords in superimposed layers upon the core at exactly the desired angle and the necessary procedure involves considerable manual labor. In contrast to this very laborious and time-consuming operation, it will be seen that my new method of manufacturing such tires provides for the simultaneous application of a multiplicity of assembled cords constituting a circumferentially continuous cord layer, to the tire forming core, thus insuring the application of the individual cords at exactly the same angle with relation to the core axis. By means of this method, the superimposed cord layers may be very expeditiously and accurately assembled and as the method is entirely performed by automatically operated mechanisms, it will be appreciated that very rapid production is possible. This improved method I have more particularly defined in certain of the appended claims. It will be readily recognized by those versed in this art that certain of the fundamental principles of my present invention may possibly be used to advantage in the manufacture of tire casings largely composed of fabric laminations, as well as tire casings wherein the body structure is composed of superimposed laminations each consisting of a multiplicity of parallel individual cords.

It will further be manifest that the machine above described for carrying out my new method possesses many novel features. These features of my machine I have likewise incorporated in certain other of the appended claims.

While I have herein disclosed a practical embodiment of the method and machine for manufacturing cord tires, it is nevertheless to be understood that the same is susceptible of exemplification in numerous alternative forms and I according reserve the privilege of adopting all such legitimate changes as may be fairly embodied within the spirit and scope of the invention as claimed.

I claim:

1. In a cord tire building machine, means for assembling individual cords of predetermined length in parallel relation to each other, and automatic means for transferring the assembled cords and applying the same upon a tire forming core in a continuous circumferential layer.

2. In a cord tire building machine, means for assembling individual cords of predetermined length in parallel relation to each other, and automatic means for applying the assembled cords upon a tire forming core, said means including a cord layer movable into embracing relation to the core, and means for transferring the assembled cords to said cord layer.

3. In a cord tire building machine, a cord carrier, means for assembling a plurality of individual cords of predetermined length upon said carrier, and means to receive the cords from the carrier and transfer the same to applied position upon a tire forming core.

4. In a cord tire building machine, a cord carrier, means for assembling cords drawn from individual cord rolls and retaining the same in position on said carrier, and automatically operable means to receive the assembled cords from the carrier and transfer the same to applied position upon a tire forming core.

5. In a cord tire building machine, means radially movable with relation to a tire forming core for simultaneously positioning a multiplicity of parallel cords upon the periphery of said core at an oblique angle.

6. In a cord tire building machine, cord applying means rectilinearly movable with relation to a tire forming core, automatically operable means for assembling a multiplicity of cord lengths upon said cord applying means from a series of cord rolls in one position of the cord applying means, and means for actuating said cord applying means to apply the assembled cords to a periphery of the tire forming core.

7. In a cord tire building machine, a series of cord applying devices radially movable with relation to a tire forming core, means for assembling a multiplicity of parallel cords upon each of said devices, and means for simultaneously actuating said devices to apply the assembled cords in the form of a circumferentially continuous cord layer to the periphery of the tire forming core.

8. In a cord tire building machine, means for automatically assembling a layer of cords for application to the periphery of a tire forming core, in the form of a plurality of circumferential sections, each consisting of a multiplicity of parallel individual cords, and automatic means for simultaneously applying said cord layer sections upon the tire forming core.

9. In a cord tire building machine, cord transferring mechanism including a cord carrier, means for reciprocating said carrier, and means for automatically shifting the carrier in an angular direction after completion of such reciprocating movement in one direction.

10. In a cord tire building machine, cord transferring mechanism including a cord carrier, means for vertically reciprocating said carrier, and means for automatically imparting a subsequent horizontal angular movement to the carrier at one end of its reciprocating movement.

11. In a cord tire building machine, means for transferring assembled individual cords to a tire forming core, said means including a cord receiving and applying device, a carrier for the assembled cords, means for vertically reciprocating said carrier, and means for horizontally moving the carrier at one end of its vertical movement to transfer the assembled cords to the receiving and applying device.

12. In a cord tire building machine, a cord carrier having a plurality of cord receiving grooves, means for vertically reciprocating said carrier, means opposed to the carrier at one end of its vertical movement and automatically operable to force the individual cords into said grooves, cord receiving and applying device opposed to the carrier at the opposite end of its reciprocating movement, and means for horizontally moving the carrier when in its latter position to transfer the cords therefrom to said receiving and applying device.

13. In a cord tire building machine, a cord carrier having a plurality of cord receiving grooves, means for vertically reciprocating said carrier, means opposed to the carrier at one end of its vertical movement and automatically operable to force the individual cords into said grooves, cord receiving and applying device opposed to the carrier at the opposite end of its reciprocating movement, means for horizontally moving the carrier when in its latter position to transfer the cords therefrom to said receiving and applying device, and means for subsequently actuating said device for applying the cords upon a tire forming core.

14. In a cord tire building machine, cord applying means radially movable with relation to a tire forming core, a cord carrier, and means for automatically actuating said carrier and the cord applying means in timed relation to transfer the cord from the carrier to said means and apply to the cord upon the periphery of the forming core.

15. In a cord tire building machine, a cord carrier, means for assembling the individual cords upon said carrier, and means carried by a part of said assembling means for severing the assembled cords to a predetermined length.

16. In a cord tire building machine, a cord carrier, provided with grooves to receive the individual cords, a reciprocable part adapted to engage and seat the cords in said grooves, and cutting mechanism independently operable after the cords have been seated, to sever the cords to a predetermined length.

17. In a cord tire building machine, a cord carrier provided with grooves to receive the individual cords, a reciprocable part adapted to engage and seat the cords in said grooves, and means mounted upon said part and operable after the cords have been seated, to sever the cords to a predetermined length.

18. In a cord tire building machine, a cord carrier, means to clamp a plurality of cords at one of their ends to said carrier, said carrier being provided with means for detachably holding the cords in assembled relation thereon, means for moving said carrier, and means for automatically releasing the clamping means when the carrier is moved to a predetermined position.

19. In a cord tire building machine, a cord carrier, means for detachably clamping a plurality of cords to one end of said carrier, means for reciprocating the carrier whereby in the movement of said carrier in one direction, the cords are drawn from individual cord rolls, means automatically operable to sever said cords, and means for actuating said clamping means to release the cords at the opposite end of the reciprocating movement of the carrier.

20. In a cord tire building machine, in combination with a tire forming core, a plurality of cord applying devices grouped around said core and movable radially with relation thereto, means for automatically supplying said devices with the individual cords, and means for simultaneously advancing said devices toward the core to apply the cords carried thereby in the form of a continuous circumferential cord layer upon the tire forming core.

21. In a cord tire building machine, in combination with a tire forming core, a plurality of cord applying devices grouped around said core and each consisting of relatively movable parts, means for automatically applying the individual cords to said devices, means for simultaneously moving said devices as a unit to a predetermined position with relation to the core, and means for simultaneously actuating the relatively movable parts of said devices to dispose the same in embracing relation to the core and apply the cords in the form of a circumferentially continuous cord layer upon said core.

22. In a cord tire building machine, in combination with a tire forming core having cord end receiving seats, means for simultaneously applying a multiplicity of parallel cords in the form of a circumferentially continuous cord layer upon said core with the cord ends engaged on said seats, and automatic means to engage and clamp the cord ends upon said seats to maintain the individual cords under tension.

23. In a cord tire building machine, in combination with a tire forming core having cord end receiving seats, means for simultaneously assembling a multiplicity of individual cords in parallel relation to each other upon said core with their ends engaged on said seats, annular reciprocable heads at opposite sides of the core, and means for simultaneously actuating said heads to cause the same to clampingly engage the said ends and maintain the cords under tension.

24. In a cord tire building machine, in combination with a tire forming core having cord end receiving seats, means for simultaneously applying a multiplicity of parallel cords in the form of a circumferentially continuous cord layer upon said core with the cord ends engaged on said seats, automatic means to engage and clamp the cord ends upon said seats to maintain the individual cords under tension, and additional means for subsequently applying bead-rings to the end portions of the cords.

25. In a cord tire building machine, in combination with a tire forming core having cord end receiving seats, means for simultaneously assembling a multiplicity of individual cords in parallel relation to each other upon said core with their ends engaged on said seats, annular reciprocable heads at opposite sides of the core, means for simultaneously actuating said heads to cause the same to clampingly engage the said ends and maintain the cords under tension, additional reciprocable members at opposite sides of the core for applying bead-rings to the end portions of the cords, and means for subsequently actuating said members.

26. In a machine of the character described the combination of a cord-carrier, means for positioning the cords relatively thereto, means for clamping the cords to the carrier, a cord-piston for seating the cords in the cord-carrier, and means for severing the cords.

27. In a machine of the character described the combination of a cord-carrier and a cord-piston relatively movable into and out of coacting relation, means for clamping the cords to the carrier, and means carried by one of said coacting members for severing the cords.

28. In a machine of the character described the combination of a cord-carrier, means carried thereby for clamping the cords thereto, a cord-piston for seating the cords in the carrier, said piston and carrier being relatively movable into coacting relation, rotary cutters carried by said piston for severing the cords, and means for operatively rotating said cutters after the cords are seated in the carrier.

29. In a machine of the character described, the combination of a cord carrier, means for clamping the cords thereto, a cord piston for seating the cords in the carrier, said piston and carrier being relatively movable into coacting relation, means for severing the cords after they are seated in the carrier, cord layers mounted above said piston, means for elevating said cord carrier into opposed relation to said cord layers, means for relatively moving said layers and carrier to deliver the cords from the carrier to said layers, and means for releasing the cord clamping means from engagement with the cords.

30. In a machine of the character described the combination of a pair of pivotally mounted cord-folders which, in their open and receiving positions, respectively, present protruding portions midway their opposite ends, respectively, a cord-carrier for receiving cords and delivering them to said cord-folders, said cord-carrier having a depressed mid-portion complementary in shape to the protruding shape of said cord-folders in their receiving positions, respectively, and a cord-piston for seating said cords in the cord-carrier, said cord-piston having a protruding midportion complementary to the depressed portion of said cord-carrier.

31. In a machine of the character described the combination of a pair of pivotally mounted cord-folders adapted for receiving a plurality of parallel cords angularly laid thereagainst, a cord-piston below said cord-layers, a cord-carrier mounted for movement in a helical path from a coacting position relatively to said cord-folders to a coacting position relatively to said cord-piston and back again, means for longitudinally oscillating said cord-carrier and for simultaneously reciprocating said cord-carrier vertically, whereby said cord-carrier is moved in a helical path, and means for clamping the cords to the lower portion of said cord-carrier during the early portion of its movement downwardly from the cord-folders to the cord-piston, whereby said cords are laid in angular relation to said cord-carrier.

32. In a machine of the character described, a cord-carrier having upper and lower parallel edges and having lateral parallel ends, said ends lying at angles, respectively, to said upper and lower edges other than ninety degrees.

33. In a machine of the character described, the combination of a cord-carrier and a cord-piston operatively mounted for coaction, each having upper and lower parallel edges and each having lateral parallel ends lying at angles, respectively, to said upper and lower edges other than ninety degrees.

34. In a machine of the character described the combination of a cord-carrier, mounted for vertical movement, means for thus moving said carrier, a cord-clamp carried by the carrier for clamping the cords thereto, means operative during the movement of the carrier in one direction for causing the clamp to engage the carrier to clamp the cords thereto, and means operative during the movement of the carrier in the opposite direction for causing the clamp to withdraw from the carrier to release the cords.

35. In a machine of the character described the combination of a cord-carrier, a cord-piston for seating cords thereon, said carrier and piston being relatively movable into coacting relation, an eccentric rotary cutter carried by said piston and operative upon the coaction of said carrier and piston for severing the cords, and means for rotating said cutter.

36. In a machine of the character described the combination of a cord-carrier, a cord-piston movable into engagement with said carrier for seating the cords thereon, an eccentric rotary cutter carried by said piston for severing the cords after they have been seated by said pistons, said eccentric cutter being out of engaging position with said cords, while the piston is seating the cords, means for advancing the piston to engage the carrier, and means connected with the piston advancing means for rotating the cutter.

37. In a machine of the character described the combination of a cord-carrier, a vertical shaft, an arm slidably mounted on said shaft and adapted to oscillate thereon, said carrier having a stem slidable in said arm normal to said shaft, a roll carried by said arm in engagement with a fixed cam for raising said arm and carrier during the oscillating movement of said arm on said shaft, means carried by said shaft for oscillating the arm, and means also carried by the shaft for sliding the stem in the arm.

38. In a machine of the character described the combination of a vertical shaft, a cord-carrier mounted for oscillation about said shaft and for movement axially of said shaft during oscillation, the forming face of said carrier being curved concentrically to said shaft and having its ends angularly disposed relatively to its upper and lower edges, said ends being parallel, said carrier also being mounted for movement toward and from said vertical shaft, means for oscillating the carrier, means for moving the carrier axially of said shaft, and means for moving said carrier toward and from said shaft.

39. In a machine of the character described the combination of a forming core, a pair of pivotally mounted cord-folders adapted to laying a plurality of parallel cords angularly about said core, means for delivering cords to the cord-folders, means for advancing the cord-folders into coacting relation with said core, and means for swinging said folders on their pivots for laying the cords about said core.

40. In a machine of the character described the combination of a forming-core, a carriage mounted for movement toward and from said core, a plurality of pairs of cord-folders pivotally mounted on said carriage, means for delivering cords to the cord-folders, means for advancing said carriage to present said folders into coacting relation with said core, and means for simultaneously swinging said folders on their pivots for laying the cords about said core.

41. In a machine of the character described the combination of an annular forming-core, a carriage mounted for movement toward and from said core in a plane parallel with an annular face of the core, a plurality of pairs of cord-folders pivotally mounted on said carriage and arranged in curved formation corresponding with a section of the annular contour of said core, the upper members of said pairs, respectively, being coupled together to oscillate in unison, the lower members of said pairs being similarly coupled, means for moving said carriage for presenting said cord-folders for coaction with said core, and means for simultaneously oscillating said folders.

42. In a machine of the character described the combination of a forming core, opposite cord-end receiving seats thereon, a pair of pivotally mounted cord-folders adapted for laying a plurality of parallel cords about said core with their ends on said seats, respectively, a pair of opposite cord-end-grippers adapted for gripping the cord-ends to said seats, respectively, means for oscillating said folders on their pivots, respectively, for laying said cords about the core, and means for actuating said grippers into coaction with said seats, respectively, for gripping the cord-ends thereto.

43. In a machine of the character described the combination of a forming-core, opposite cord-end receiving seats thereon, a pair of pivotally mounted cord-folders adapted for laying a plurality of parallel cords about said core with their ends on said seats, respectively, a pair of opposite cord-end-grippers adapted for gripping the cord-ends to said seats, respectively, a pair of opposite bead-ring spiders, respectively, each adapted to carry a bead-ring and to deliver that bead-ring against the cords and press those cords into the space between the body of the core and its adjacent gripping seat, means for actuating the cord-folders, means for actuating the grippers, and means for actuating the bead-ring spiders.

44. In a machine of the character described the combination of an annular support, an annular forming-core removably mounted thereon, opposite cord-end receiving seats adjacent the inner edge of said core, opposite cord-end-grippers, opposite bead-ring-spiders, means for delivering cords about said core with their ends on said seats, respectively, means for actuating said grippers to grip the cord-ends to said seats, and means for actuating said bead-ring-spiders to engage the cords between the gripped ends thereof and the core, whereby said cords are drawn tightly about said core, one of said cord-end-grippers and one of said bead-ring-spiders being removably mounted on their carrying members, respectively.

45. In a machine of the character described the combination of an annular support, an annular forming-core carried thereby, an axial shaft through said support and core, a pair of annular cord-end grippers carried by said shaft and oppositely disposed relatively to said core, a pair of annular bead-ring-spiders carried by said shaft outside said grippers, respectively, means carried by said shaft for moving said grippers toward and from opposite sides of said core, respectively, and means carried by said shaft for moving said spiders toward and from opposite sides of said core, respectively.

46. In a machine of the character described the combination of an axial shaft, a plurality of cord carrier shafts arranged about said axial shaft in parallelism therewith, an arm carried by each of said cord carrier shafts, a cord carrier carried by each of said arms and mounted for movement in said arm toward and away from its carrying shaft, means mounted on said axial shaft for oscillating said arms on their shafts, respectively, means for moving said arms lengthwise their shafts, respectively, during their oscillation, and means mounted on said axial shaft in engagement with means mounted on said carrier shafts for moving said cord carriers toward and from their shafts, respectively.

47. In a machine of the character described the combination of an annular forming-core, a plurality of carriages arranged symmetrically about said core and mounted for movement toward and from said core in a plane parallel with the plane of the core, each carriage having mounted thereon a cord-layer arranged in curved formation complementary to the adjacent portion of said core, means for moving said carriages to position said cord-layers in embracing relation to said core.

48. In a machine of the character described the combination of an annular forming core, a plurality of carriages arranged symmentrically about said core and mounted for movement toward and from said core in a plane parallel with the plane of the core, each carriage having mounted thereon a cord-layer arranged in curved formation complementary to the adjacent portion of said core, means for moving said carriages to position said cord-layers in embracing relation to said core, said cord layers being in the aggregate sufficient to entirely surround the periphery of said core when presented in coacting relation therewith, and means for supplying said cord-layers with their complement of cords, respectively, whereby said cord-layers will simultaneously deliver to said core a continuous annular web of cords entirely encircling said core.

49. In a machine of the character described, operating mechanism including an oscillatable shaft, an oscillatable cradle operatively connected with said shaft, said cradle having therein two radial slots angularly disposed to each other, a roll mounted for movement in a planetary path for engagement with one of said slots for oscillating said cradle in one direction, a second roll mounted for movement in a planetary path adjacent said first mentioned roll for engagement with the other of said slots for oscillating said cradle in the other direction, and means for actuating said rolls.

50. In a machine of the character described the combination of a carriage mounted for reciprocatory movement, cord-layers on said carriage, an oscillatable shaft, means for reciprocating said carriage from said shaft, an oscillatable cradle operatively connected to said shaft, said cradle having two radial slots angularly disposed to each other, two intermeshing equal gears each carrying an eccentric roll for engagement with one of the slots of said cradle, an oscillatable gear segment operatively connected with one of said gears, and cam actuated means for oscillating said segment.

51. In a cord tire building machine, a plurality of cord applying devices grouped about a tire forming core and movable in the plane thereof, and means for simultaneously actuating said devices to apply a circumferentially continuous layer of cords upon the core.

52. In a cord tire building machine, a series of cord carriers, cord supplying means associated with each carrier, a series of cord receiving and applying devices, and mechanism for synchronously actuating the series of supply means, the cord carriers, and the receiving and applying devices in timed relation to each other from a single source of power.

53. In a cord tire building machine, a series of cord carriers, cord supplying means associated with each carrier, a series of cord receiving and applying devices, mechanism for synchronously actuating the series of supply means, the cord carriers and the receiving and applying devices in timed relation to each other from a single source of power, and means for clamping the applied cords upon the forming core also operatively controlled from said power source.

54. In a cord tire building machine, means for transferring assembled individual cords to a tire forming core, said means including a carrier for the assembled cords, a cord receiving and applying device, and means for moving one of said parts with respect to the other to thereby position the assembled cords for transference to said device, and means for then effecting a further relative movement of said parts and the transference of the cords from said carrier to the receiving and applying device.

55. In a cord tire building machine, means for transferring assembled individual cords to a tire forming core, said means including a carrier for the assembled cords, a cord receiving and applying device and means for reciprocating one of said parts with respect to the other to position the assembled cords at the end of the reciprocating movement in one direction for transference to said device, and means for then effecting a further relative movement of said parts in an angular direction with respect to the direction of reciprocating movement to thereby transfer the cords from said carrier to the receiving and applying device.

56. In a machine for building laminated tire structures, a plurality of identical parts movable in the plane of a tire forming core, each of said parts adapted to apply a circumferential section of a continuous lamination of a tire structure upon said core, and means for actuating said parts.

57. In a machine for building laminated tire structures, means for applying a circumferentially continuous lamination of a tire structure upon a tire forming core, said means including synchronously operable parts movable in the plane of the tire forming core.

58. In a machine for building laminated tire structures, means for applying a circumferentially continuous lamination of a tire structure upon a tire forming core, said means including synchronously operable parts movable in the plane of the tire forming core, and means for simultaneously positioning sections of the lamination upon said parts.

59. In a machine for building laminated tire structures, synchronously operable devices movable in the plane of a tire forming core, means for supplying a part of a lamination of a tire structure to each of said devices, and means for actuating said devices to simultaneously assemble the parts of the lamination upon the forming core.

60. In a machine for building laminated tire structures, synchronously operable devices movable in the plane of a tire forming core, means associated with each of said devices for supplying a part of a lamination of the tire structure thereto, mechanism for simultaneously actuating all of said last named means, and additional means for actuating said devices to simultaneously assemble said parts and apply the same to the core in the form of a circumferentially continuous lamination.

61. In a machine for building laminated tire structures, a tire forming core, means movable radially relative thereto for applying a lamination of the tire structure throughout the circumferential extent of the core, mechanism for automatically delivering the tire lamination to said lamination applying means, and actuating mechanism to advance and retract said lamination applying means with respect to the core.

62. In a method of building cord tires, preparing a layer of cords for application to a tire forming core by first assembling individual cords at a point in axially spaced relation to the tire forming core and holding said cords in definitely spaced relation to each other, and then bodily moving all of the cords as a unit from such position to a position in radially opposed relation to the core for application thereto.

63. In a method of building cord tires, preparing a layer of cords for application to a tire forming core by first drawing the individual cords from separate reels and holding portions of the cords in definitely spaced relation to each other at a point axially spaced from the tire forming core, then severing said spaced portions of the cords to provide cord lengths to form a single layer of cords when applied to the core, and then bodily moving said spaced cord lengths as a unit to a position in radially opposed relation to the tire forming core for application thereto.

64. In a method of building cord tires, first assembling individual cords in sufficient number and length to form a single layer of cords when applied to a tire forming core and holding said cord lengths in substantially parallel fixed spaced relation to each other, then positioning said assembled cord lengths in radially spaced relation to the tire forming core, and then moving said cord lengths as a unit and simultaneously folding the same into applied position upon the surfaces of the tire forming core.

65. In a method of building cord tires, first assembling individual cords in sufficient number and length to form a single layer of cords when applied to a tire forming core and holding said cord lengths in substantially parallel fixed spaced relation to each other, and then transferring the assembled cord lengths to cord applying means while maintaining the spaced relation between the cords for application to the tire forming core.

In testimony that I claim the foregoing as my invention I have signed my name hereunder.

KNUT O. B. TEXTORIUS.